(12) United States Patent
Helmikkala

(10) Patent No.: US 9,822,925 B2
(45) Date of Patent: Nov. 21, 2017

(54) ARRANGEMENT FOR FASTENING ELEMENTS TO A WALL

(71) Applicant: HIDDEN VIEW OY, Espoo (FI)

(72) Inventor: Ilkka Helmikkala, Espoo (FI)

(73) Assignee: COOLSOME OY, Espoo (FI)

( * ) Notice: Subject to any disclaimer, the term of this patent is extended or adjusted under 35 U.S.C. 154(b) by 205 days.

(21) Appl. No.: 15/037,091

(22) PCT Filed: Dec. 19, 2012

(86) PCT No.: PCT/FI2012/051276
§ 371 (c)(1),
(2) Date: May 17, 2016

(87) PCT Pub. No.: WO2013/093203
PCT Pub. Date: Jun. 27, 2013

(65) Prior Publication Data
US 2016/0290553 A1  Oct. 6, 2016

(30) Foreign Application Priority Data

Dec. 19, 2011 (FI) ...................................... 20116288

(51) Int. Cl.
*A47F 5/08* (2006.01)
*F16M 13/02* (2006.01)
(Continued)

(52) U.S. Cl.
CPC ............. *F16M 13/02* (2013.01); *A47B 47/05* (2013.01); *F16M 11/045* (2013.01); *F16M 2200/022* (2013.01); *H04N 5/64* (2013.01)

(58) Field of Classification Search
USPC .................................................. 248/231.91
See application file for complete search history.

(56) References Cited

U.S. PATENT DOCUMENTS 7,448,584 B2 * 11/2008 Chen ...................... F16M 11/10
                                                    248/122.1
7,712,717 B2 *  5/2010 Burns .................... F16M 11/10
                                                    248/291.1
(Continued)

FOREIGN PATENT DOCUMENTS

DE       202011005502 U1   10/2011
WO          2011/131838 A1   10/2011

OTHER PUBLICATIONS

International Search Report, dated Apr. 23, 2013, from corresponding PCT application.
(Continued)

*Primary Examiner* — Monica Millner
(74) *Attorney, Agent, or Firm* — Young & Thompson

(57) ABSTRACT

An arrangement for fastening a first element, such as a television, and a second element, such as a decorative element to a wall, includes a base structure, which includes four connectable members configured for forming a braced base structure, when base structure is fastened to the wall with fastening elements from at least four fastening points. Further, the arrangement includes at least one first fastening member mounting the first element to the base structure and at least one second fastening member, which first and second fastening members are configured for fastening to the first and the second elements, respectively, and moving elements for moving the second fastening member between a first position and a second position, which moving elements are configured for connecting to the second fastening member in order to mount the second element to the base structure optionally via base members.

17 Claims, 13 Drawing Sheets

(51) Int. Cl.
*F16M 11/04* (2006.01)
*A47B 47/05* (2006.01)
*H04N 5/64* (2006.01)

(56) References Cited

U.S. PATENT DOCUMENTS

| | | | | |
|---|---|---|---|---|
| 7,918,428 | B2* | 4/2011 | Kim | F16M 11/048 248/295.11 |
| 8,267,366 | B2* | 9/2012 | Cheng | F16M 11/046 248/121 |
| 8,276,864 | B2* | 10/2012 | Ye | F16M 11/04 248/287.1 |
| 8,505,860 | B2* | 8/2013 | Schluter | F16M 11/041 248/125.1 |
| 2007/0103605 | A1* | 5/2007 | Maruta | F16M 11/22 348/797 |
| 2008/0151483 | A1* | 6/2008 | Holbrook | F16M 11/10 361/679.01 |
| 2010/0309615 | A1* | 12/2010 | Grey | F16M 11/10 361/679.01 |
| 2011/0260026 | A1 | 10/2011 | Ye et al. | |
| 2012/0255919 | A1 | 10/2012 | Jones et al. | |

OTHER PUBLICATIONS

FI Search Report, dated Oct. 11, 2012, from corresponding FI application.

\* cited by examiner

ARRANGEMENT FOR FASTENING ELEMENTS TO A WALL

TECHNICAL FIELD

Generally, the invention relates to an arrangement for fastening elements. More specifically, the invention relates to an arrangement for fastening elements to a wall.

BACKGROUND TECHNOLOGY

It is a normal situation that people have limited space at home. Especially, there is a constant need for a wall space, because the home entertainment units are growing all the time. The wide screen television techniques have almost totally replaced traditional cathode-ray tube televisions, which depth is directly proportional to the screen size. The wide screen televisions are lighter and thinner than the cathode-ray tube televisions, which enable to mount them to the wall. However, a wide screen television conquer a large space from a wall and still there is a need to have a place for CD:s, DVD:s, games, remote controls, photographs and all other items people want to keep in their living room. Among other things, a big black screen in a central place on the wall in a living room is just not pretty.

One main problem, when fastening elements to a wall at home, is that many interior walls are not bearing walls. In practice, this means that these walls are made of some light material, such as gypsum plaster. The bearing capacity of these drywalls is limited and special fastening means is required to use when fastening elements to such wall.

Document WO2011131838 A1 discloses an interior decoration element or piece of furniture to media hardware configuration, such as for example a television. The interior element or piece of furniture includes a body unit, which carries the whole mass of the media hardware configuration and makes a simple mounting of the media hardware configuration possible. For merging the media hardware configuration as part of interior decoration wholeness, the interior element or piece of furniture is provided with at least one door panel, which can be moved from a closed state, where the door panel covers a media hardware configuration behind the same, to the open state, where the media hardware configuration is visible. The body unit or frame of the interior element or piece of furniture includes a suspension or support structure, which can be attached to any wall or background structure, whereby, for mounting the media hardware configuration, the body unit or frame of the interior element or piece of furniture comprises a fastening part or profile, to which the media hardware configuration can be fixed, advantageously according to the most general standards.

Unfortunately, the solution disclosed in above mentioned document has disadvantages. Several different size body units are needed for installing different size of televisions or other elements to a wall. The body unit itself is heavy, which complicates the fastening of the elements to the wall or may even prevent the mounting of elements to a drywall, for example.

SUMMARY OF THE INVENTION

The purpose of the present invention is to avoid or, at least, reduce disadvantages of the prior art solution described above.

An object of the invention is to provide an arrangement for various size elements.

Another object of the invention is to provide an arrangement for securely fasten elements to a wall.

According to a preferable embodiment an arrangement for fastening a first element, such as a television, and a second element, such as a decorative element like a panel, to a wall, comprises a scalable base structure, which base structure comprises four connectable members; a top member, bottom member and two side members extending between the top member and the bottom member, wherein side members connected to the top member and the bottom member are configured for forming a braced base structure, when base structure is fastened to the wall with fastening means from at least four fastening points. Further, the arrangement comprises at least one first fastening member mounting the first element to the base structure and at least one second fastening member, which first and second fastening members are configured for fastening to the first and the second elements, respectively. In addition, the arrangement comprises moving means for moving said second fastening member between a first position and a second position, which moving means are configured for connecting to the second fastening member in order to mount the second element to the base structure optionally via the top member and/or the bottom member.

In one embodiment, the arrangement comprises at least one adjustable member for adjusting the length of the adjustable member, which adjustable member comprises at least one first member part and at least one second member part, which first member part and second member part are connectable with each other, which a first member part comprises at least one groove section and a second member part comprises a male section, which male section is connectable to one groove section, and which the connection of the first member part and the second member part forms a braced adjustable member.

In another embodiment, the side members of the base structure are formed by said adjustable members in order to adjust the height of said base structure by adjusting the length of the side members.

Yet, in another embodiment, the first fastening member is formed by said adjustable member in order to adjust the height of the first fastening member.

In one embodiment, the second fastening member comprises a first section and a second section, which first section and second section are configured for fastening to the second element.

In one embodiment, the first position of the second element is in front of said first element, when in use, for covering the first element.

In another embodiment, second position of the second element is arranged to reveal the first element, when in use.

Yet, in another embodiment, the moving means for moving said second element are slidable means.

Some preferable embodiments of the invention are described in the dependent claims.

Significant advantages can be achieved with the present invention when compared to the prior known solutions. As solution disclosed in prior art, the present invention may save space on the wall, when two elements can be fastened to the same arrangement. Furthermore, the first element can be totally covered, when not in use, and thus be hided with the second element.

The arrangement of the present invention may be lightweight and may be fitted in a small volume, when in a package, because due to congruent forms of the first fastening member and the side member, the first fastening member and the side member can be nested with each other, for example. The same congruent form also enables the using of same tool for manufacturing the first fastening member and the side member, which may alleviate the manufacturing process of the arrangement.

In spite of the lightweight parts of the arrangement, the base structure may provide braced connections, which may spread total weight to the area on the wall delimited by said base structure. This feature may alleviate fastening of elements securely also to difficult materials, such as a drywall, for example. In addition, a braced connection of the fastening member's fastening sections may also alleviate firmly and easy fastening of the first element to the base structure.

The scalable base structure and adjustable first fastening means may enable the invention to be applied to various sizes of first elements to be fastened, such as television screens, for example. Further, various other elements than television screen may be used as a first element in the present invention, i.e. securely and firmly fasten to a wall and cover with the second element, when not in use.

In addition, the second element of the present invention may also be selected among wide range of various elements. As being a decorative element, there are countable alternatives for the second elements.

The arrangement according to the present invention may enable a planar assembly of the first element to the wall so that only the air space, which is typically required with flat screen television assemblies, is left between the wall and the first element. This feature may enable to hide e.g. a flat screen television also in side view.

Furthermore, the present invention provides an easily adjustable member to be used to adjust the dimensions of the arrangement. The adjustable member further provides a braced connection, which may sustain torsion better than a non-adjustable member. The adjustable member may also provide an easy way to adjust the length of the member.

Moreover, the arrangement is arranged so that only one person may be needed to fasten it, the first and the second element to the wall.

In the present document, the term "braced connection" refers herein to a connection between two members or parts, which members or parts are disposed so that one end of each member or part is partially overlapping in a nested position, thus preventing rotation or twist of members or parts relative to each other in the plane formed by the bases of the members or the parts.

In the present document, the term "vertical plane" refers the plane formed by the wall, to which the arrangement is mounted.

Further, the term "horizontal plane" refers in this document to the plane, which is in perpendicular position with the wall and in parallel with the floor level.

SHORT DESCRIPTION OF THE DRAWINGS

Next, the invention is described in more detail with reference to the appended drawings, in which FIG. 1a depicts a perspective view of the arrangement according to an embodiment of the present invention;

FIG. 1b depicts an exploded view of the arrangement according to embodiment FIG. 1a;

FIG. 1c depicts a front view of the arrangement in FIG. 1a;

FIG. 1d depicts a side view of the arrangement in FIG. 1a;

FIG. 1e depicts moving means in a side view of the arrangement depicted in FIG. 1d;

FIG. 4b depicts a side view of the top member according to FIG. 4a;

FIG. 4c depicts an exploded view of the top member according to FIG. 4a;

FIG. 5b depicts a side view of the bottom member according to FIG. 5a;

FIG. 5c depicts an exploded view of the bottom member according to FIG. 5a;

FIG. 6b depicts an exploded view of the horizontal member according to FIG. 6a;

FIG. 8b depicts an exploded view of the upper second fastening member according to FIG. 8a;

FIG. 9b depicts a locking member for the second fastening member according to FIG. 9a;

FIG. 9c depicts a second element assembly according to the embodiment in FIG. 9a.

Figure 1A:
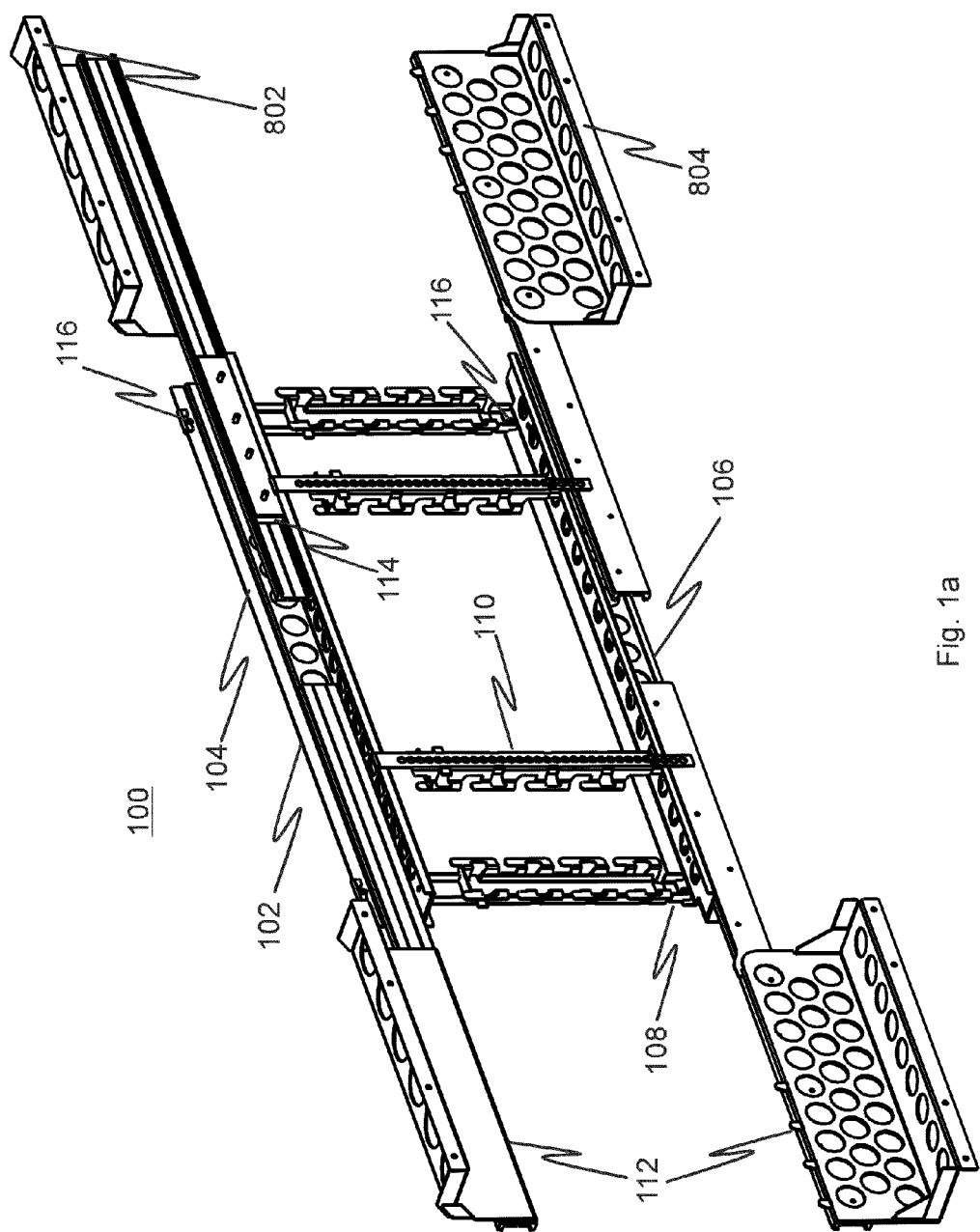
Figure 1B:
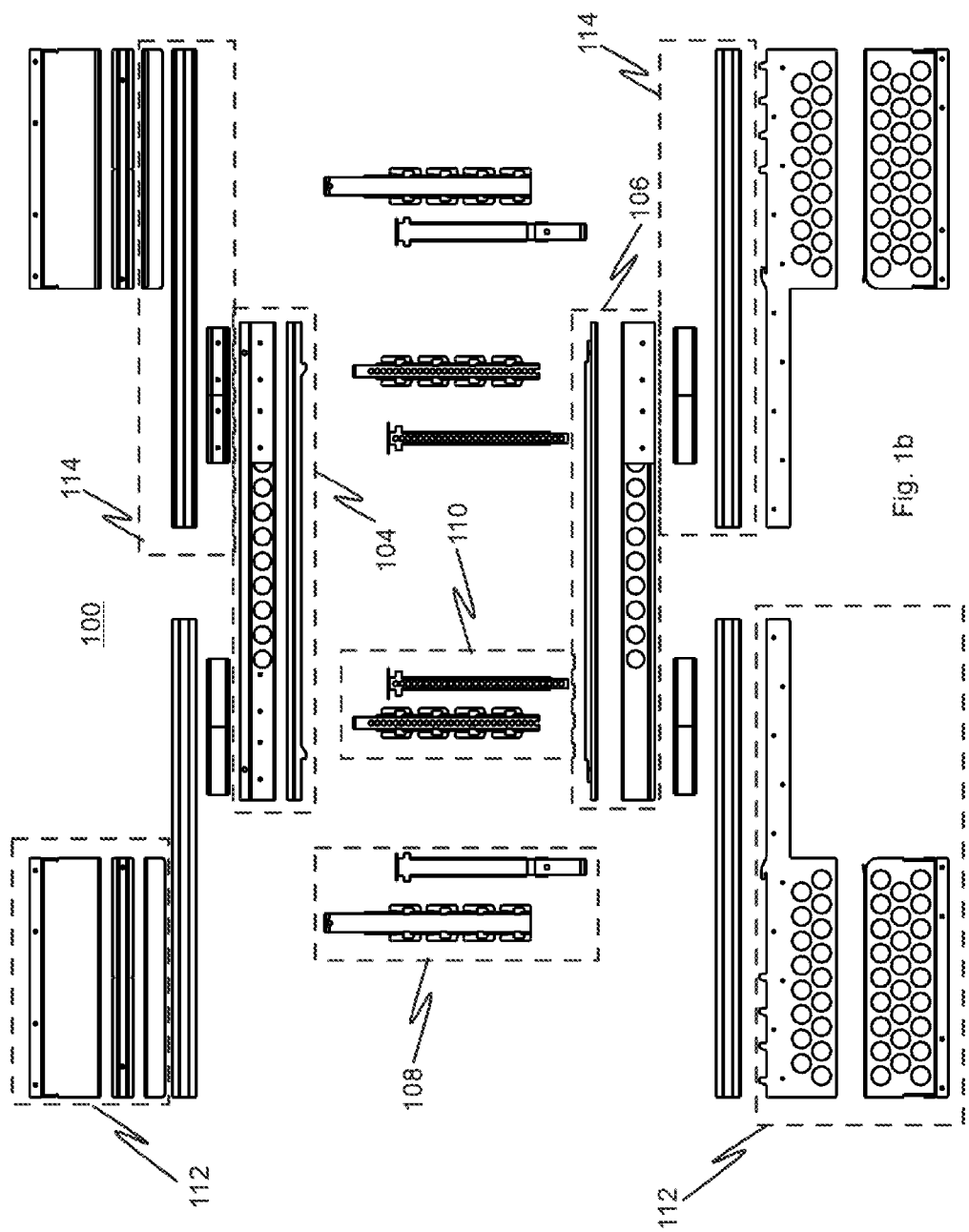
Figure 1C:
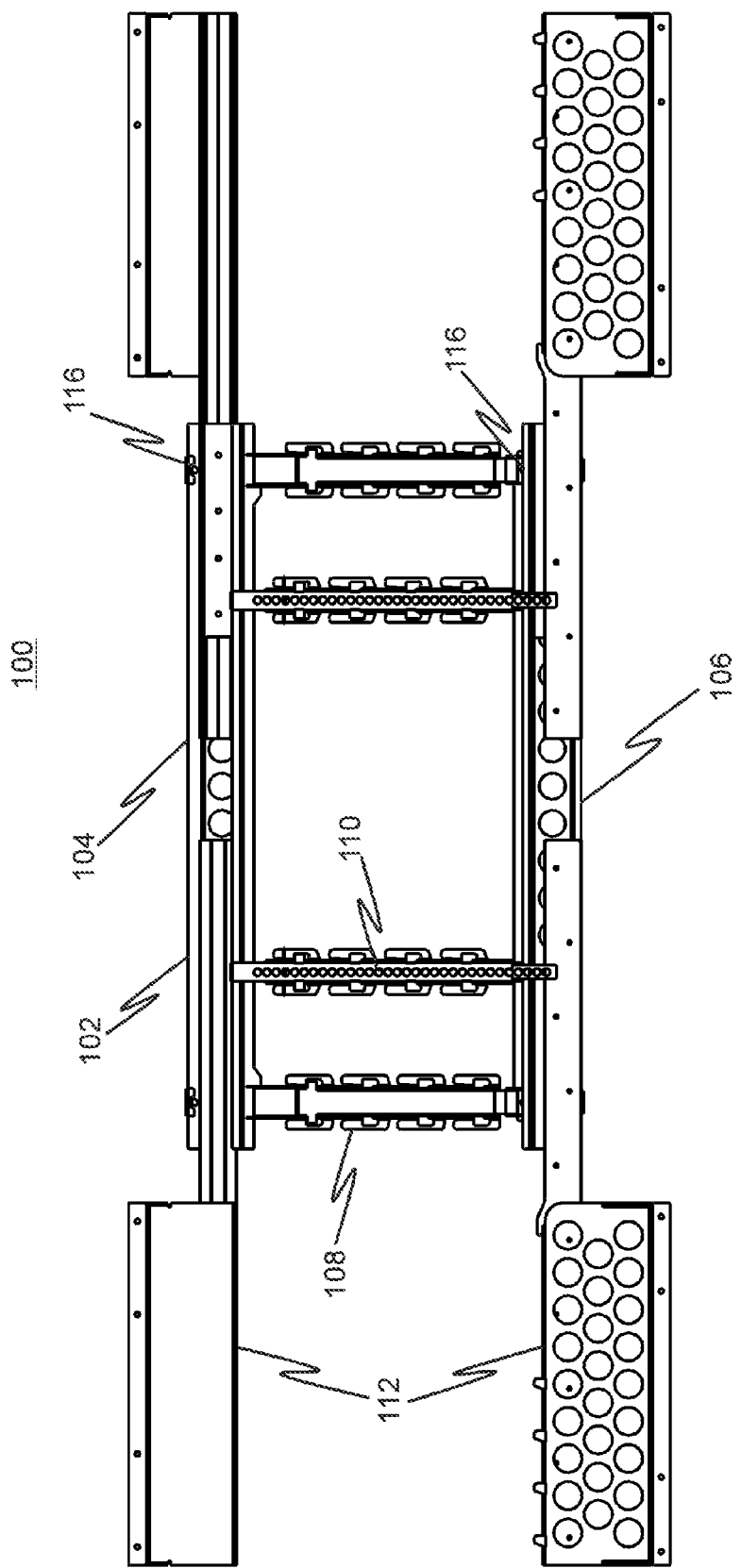

Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

DETAILED DESCRIPTION OF THE EMBODIMENTS

Referring to FIGS. 1a-1e depicted a perspective view, an exploded view, a front view, a side view and moving means in a side view, an arrangement according to an embodiment of the present invention is disclosed. Another embodiment of the present invention is depicted in FIG. 2. The arrangement 100 comprises base structure 102, which base structure comprises preferably elongated top member 104 and bottom member 106, and at least two side members 108. The arrangement 100 further comprises at least one first fastening member 110 for mounting the first element to the base structure 102, which first fastening member 110 is configured for fastening to the first element (not shown), at least one second fastening member 112, which second fastening member 112 is configured for fastening to the second element (not shown), and moving means 114 for moving the second fastening member 112 between a first position and a second position, which moving means are configured for connecting to the second fastening member in order to mount the second element to the base structure optionally via the top member 104 and/or bottom member 106.

The arrangement according to the present invention is preferably made of some rigid and durable material, such as steel, aluminum, etc., to name a few examples. However, some parts of the arrangement can be made of some another appropriate material.

The arrangement according the present invention is objected for fastening a first element, such as a flat screen television, to a wall securely, and attach a second element, such as a decorative element like a panel, to the arrangement so that the second element is arranged to cover the first element, when the first element is not in use, and is arranged to reveal the first element, when it is intended to use.

The first element of the present invention is preferably a flat element, which is normally wanted to be fastened to a wall, such as a flat screen television, display, silver screen to name a few. The person skilled in the art will appreciate that the first element is not limited to the above mentioned elements, but the first element can be any element suitable to be fastened to a wall and to be covered with the second element.

Respectively, the second element is an element suitable to be fastened to the arrangement and suitable for moving such that the first element is covered and revealed by the second element when moving it with moving means. Thus, the second element can be for example, but not limited to, a decorative element, such as a decorative panel, lightweight shelves or some other suitable element.

In one embodiment, the decorative element is a sheet made of e.g. relative rigid plastic, having slightly convex form in the vertical position. Such plastic sheet can be fixed to a back frame, which is made of aluminum, for example. The back frame with the plastic sheet is further connected to the second fastening member. The advantage of the above described embodiment is that the second element, i.e. the plastic sheet and its frames can be arranged to an especially small volume, when in package, and changing of the second element is easy and fast.

In another embodiment, the second element is built from pieces, such as wood pieces, which are stacked one upon another and fastened with a supporting frame extending behind the pieces. Normally, in this embodiment, the pieces are provided with a groove and the supporting frame has a respective projection, or vice versa. The projection may extend throughout the height of the piece stack. The supporting frame with piece stack is further connected to the second fastening member.

The person skilled in the art will understand that the decorative element can be made of some other suitable material, or built in some other way, and the embodiments described above are meant to be as an example of the decorative element.

As disclosed above, the base structure 102 of the present invention comprises the top and the bottom members 104, 106 and at least two side members 108. The top and the bottom members 104, 106 are arranged in a substantially horizontal position on the wall one below another and the side members 108 are extending substantially vertically between the top and the bottom members 104, 106 and connecting them.

In one embodiment depicted in FIG. 2, the top member and the bottom member are identical. When mounted on the wall, the bottom member is set upside down comparing to the position of the top member, so that a single rail in the bottom member is below a double rail. Respectively, the top member is mounted so that the single rail is above the double rail. The person skilled in the art will understand that the top member and the bottom member can be arranged so that they can be mounted so that the double rail in the top member is above the single rail and vice versa in the bottom member.

The side members 108 connecting the top member 104 and the bottom member 106 are together arranged to form the base structure 102 with braced connections, which base structure provides a spreading of total weight of the arrangement, the first element and the second element to the area on the wall delimited by the base structure 102. The base structure 102 is fastened to the wall with fastening means from at least four fastening points 116. The braced connection of the base structure 102 is described in more detail below.

Fastening means used for fastening the base structure can be any typically used fastening means such as, but not limited to, screws, screws with plugs, anchors, wall drillers, toggle wall grips, such as nylon toggle wall grips, bolts, such as molly bolts and toggle bolts. The person skilled in the art will understand that other suitable fasteners can also be used to fasten the base structure to the wall. The person skilled in the art will also understand that the fastening points are typically holes suitable for fastening means mentioned above in embodiments, where the above mentioned fastening means are used. In other embodiments used another fastening means, the fastening points are arranged to be suitable for them.

In one embodiment, the base structure is further provided with claws, which are intended to sink into the wall, when fastening the base structure, to provide a grip to the base structure from the wall. Depending on embodiment, the top member, the bottom member and/or side members can be provided with claws. The claws are preferably arranged in an angle with respect to the vertical plane of the base structure and to direct toward the wall or downwards from it.

In one embodiment, the dimensions of base structure of the present invention are adjustable according to the dimensions of the first element intended to be mounted to it. Depending on embodiments, the scalability of the base structure can be implemented by using an adjustable member for adjusting the length of the top and the bottom members and/or side members.

Typically, the height of the base structure is preferably about 350 mm-1000 mm, more preferably about 400 mm-700 mm, and the width of the base structure is preferably about 500 mm-1600 mm, more preferably 600 mm-1200 mm.

The above mentioned dimensions can be selected to correspond widescreen televisions, having 16:9 aspect ratio, preferably with screen dimensions from e.g. 26" to 75", more preferably with screen dimensions from 32" to 55". The person skilled in the art will appreciate that the dimensions of the base structure can be selected in some other manner, and the dimensions are not limited to above mentioned values.

In one embodiment, the length of the top and the bottom members as well as the length of the side members are selected to correspond the dimensions of the first element. In some other embodiment, the top and the bottom members are selected to correspond the first element so that the length of the top and the bottom members is at least e.g. about 10 mm-100 mm more than the width of the first element and the side members are adjusted according to the height of the first member so that the length of the side members is at least e.g. about 10 mm-100 mm more than the height of the first element. It should be noted that the top and the bottom members can be selected so that the length of the top and the bottom member is more than the above mentioned values or the length of the top and bottom members and/or side member is selected according to some other criteria.

In another embodiment, both side members and the top and the bottom members are adjusted according to the first element by using an adjustable member of the present invention.

Figure 3A:
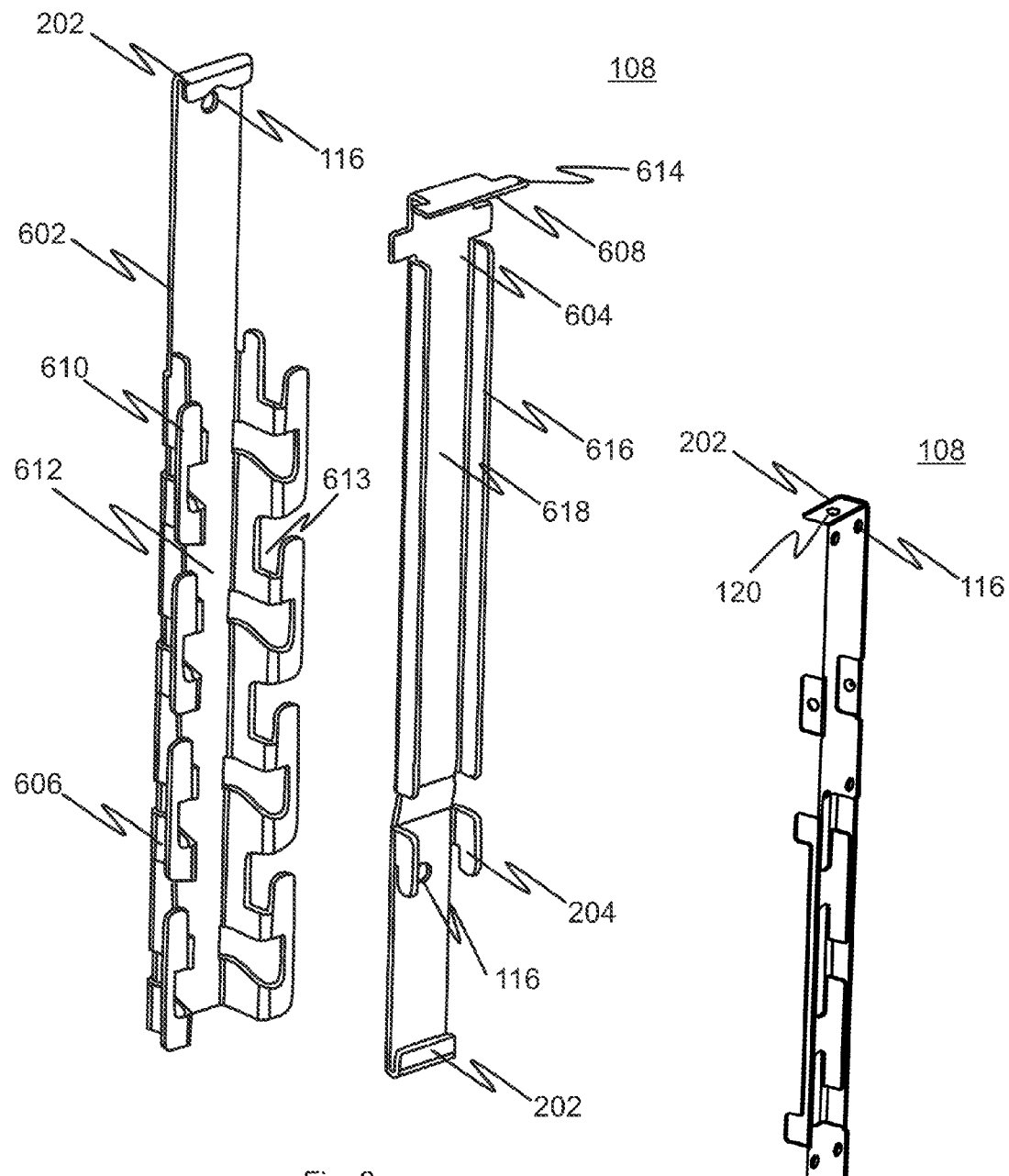
FIG. 3a depicts a side member according to an embodiment of the present invention.

The side member according an embodiment is depicted in more detail in FIG. 3a. The side member preferably comprises a folded section 202 at both ends of the side member 108 and crook sections 204 at both sides of the side member 108. The upper folded section 202 of the side member 108 is mounted to the top member 104, and the lower folded section of the side member 108 to the bottom member 106, respectively. The crook sections 204 are mounted to an upper part of the bottom member 106. In the present embodiment, two of the mentioned four fastening points 116 are arranged to the side member; one right below the upper folded sections 202 and the other right below the crook sections 204. Respective points are arranged to the respective places in the top member 104 and in the bottom member 106. By fastening the base structure to the wall from these points with fastening means the base structure is prevented to twist in a vertical plane of the wall.

Figure 3B:
FIG. 3b depicts a side member according to another embodiment of the present invention.

The side member 108 according to another embodiment, depicted in FIG. 3b, has a constant length, which is selected so that the height of the base structure will be desired. The folded section 202 is typically provided in both ends of the side member 108. Depending on embodiment, the folded section 202 can be folded e.g. substantially 90 degrees upwards or e.g. substantially 180 degrees, which enables the side member 108 to hang on the top member. In embodiment depicted in FIG. 3b, the folded section comprises a fastening point 120 for fastening the folded section 202 of the side member 108 to the top member or to the bottom member. However, this fastening is optional.

The side member according to FIG. 3b also comprises one or more fastening points 116 at both end for fastening the side member along with the top member and the bottom member to the wall. A braced structure can be achieved when base structure, i.e. side members with the top and the bottom members, is fastened to the wall using at least four fastening points.

As described above, the side member can be adjustable. Next, the structure and the function of the adjustable member are described in connection with the side member 108 depicted in more detail in FIG. 3a. It should be noted that any adjustable member in the present invention can be implemented in the same manner. The height of the base structure is adjusted according to the first element by adjusting the length of side members 108. The side members 108 preferably comprises two connectable member parts; a first member part 602 and a second member part 604, which the first member part 602 comprises at least one groove section, in the present embodiment, four groove section 606 and the second member part 604 comprises a male section 608.

The first member part comprises preferably e.g. about 2-20 groove sections, more preferably e.g. about 3-10 groove sections, most preferably e.g. about 4-6 groove sections. The person skilled in the art will understand that one male section is required to form a connection between the first member part and the second member part, but the second member part can comprise more than one male section.

Depending on embodiments, the adjustable member can comprises more than two connectable member parts, such as 3-5 member parts. In embodiments comprising more than two connectable member parts, the member parts are provided with suitable sections so that the folded sections are arranged at the both ends or at one end of the adjustable member, and each connection of the member parts is implemented with the groove section and the male section.

As can be seen in FIG. 3a, the groove sections 606 in the first member part 602 are formed from near to one of the first member part's ends so as to protruding upwards and outwards from the planar level of the first member part 602 and thus providing a row of brackets 610 on both sides of the first member part 602 and a longitudinal recess 612 between the brackets 610 along the first member part 602. Grooves 613 for the male section 608 are provided between the brackets 610 on both sides of the first member part 602.

Furthermore, the male section 608 of the second member part 604 is preferably formed at one of the second member part's 604 ends. The male section 608 is formed to protruding upwards from the planar level of the second member part 604 in a substantially perpendicular position with the second member part 604. Preferably, the male section 608 comprises two extending parts 614 extending to both sides of the second member part 604, which extending parts 614 are arranged to set to the grooves 613 at the same level on both sides of the first member part 602. In addition, the second member part 604 preferably comprises two side sections 616 arranged to the both side of the second member part 604 in a substantially perpendicular position with the second member part 604, which side sections 616 provide a longitudinal recess 618 along the second member part 604 respectively to the first member part 602.

In one embodiment, connecting of the first member part 602 and the second member part 604 is performed by placing the second member part 604 in the first member part 602 so that the second member part 604 is preferably in a substantially perpendicular position relative to the first member part 602. The male section 608 of the second member part 604 is set to a desired groove section 606 of the first member part 602 so that the extending parts 614 of the male section 608 are set to the grooves 613 of the groove section 606 at the same level on both sides of the first member part 602. Then, the second member part 604 is turned so that the second member part 604 sets to the same planar level with the first member part 602 extending from the first member part 602.

In another embodiment, connecting of the first member part 602 and the second member part 604 is performed by placing the second member part 604 in the first member part 602 so that the second member part 604 is preferably in the same planar level with the first member part 602, but substantially perpendicular position relative to the first member part 602. The second member part 604 is then rotated in the planar level so that the second member part 602 is extending from the first member part 602 and the male section 608 of the second member part 604 is locked to the groove section 606 of the first member part 602.

In a preferable embodiment, the second member part 604, in its locked position with the first member part 602, is partially overlapping the first member part 602 so that the second member part 604 is placed in the longitudinal recess 612 of the first member part 602, and walls on the both sides of the first member part 602, provided by groove section 606 protruding upwards from the planar level of the first member part 602, are set against the two side sections 616 of the second member part 604 in a nested position. Together with the connection of the groove section 606 and the male section 608 the partially overlapping nested position of the first member part 602 and the second member part 604 provide a braced adjustable member.

Figure 4A:
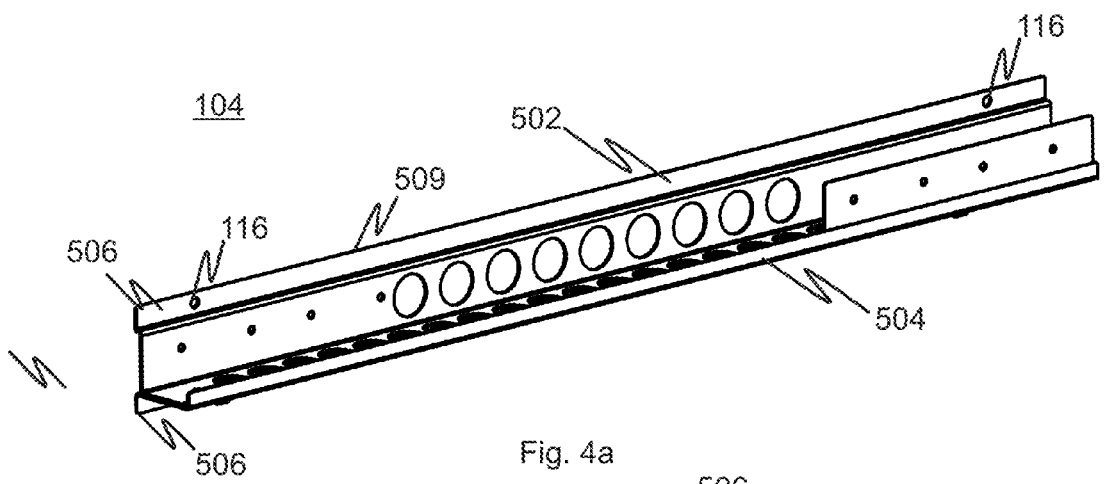
FIG. 4a depicts a perspective view of a top member according to an embodiment of the present invention.
Figure 4B:
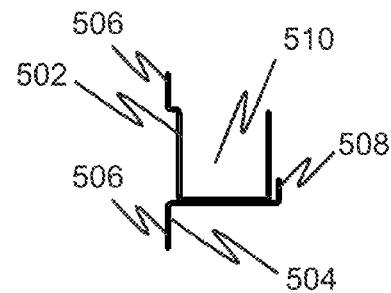
Figure 4C:
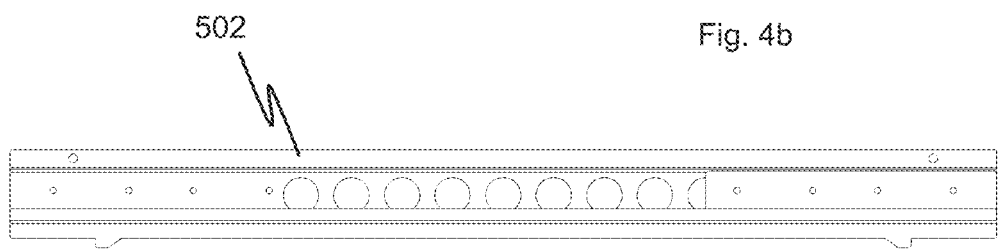

Next, the top member and the bottom member are described in more detail. In FIGS. 4a-4c are depicted a perspective view, side view and exploded view of a top member according to an embodiment of the present invention. The top member 104 of the present embodiment is composed by two parts; a first top part 502 and a second top part 504. The parts 502 and 504 are placed the first top part 502 on the second top part 504. Further, both parts 502 and 504 comprise a planar section 506, which planar sections 506 are arranged to be placed against the wall. The planar section 506 of the first top part 502 ends with an edge 509, which directs upwards along the wall, when the base structure is fastened to the wall. The upper folded section of the side members is arranged to hang on that edge 509. The fastening points 116 respective to the side members' fastening point are arranged to the first top part 502.

Figures 1D, 1E:
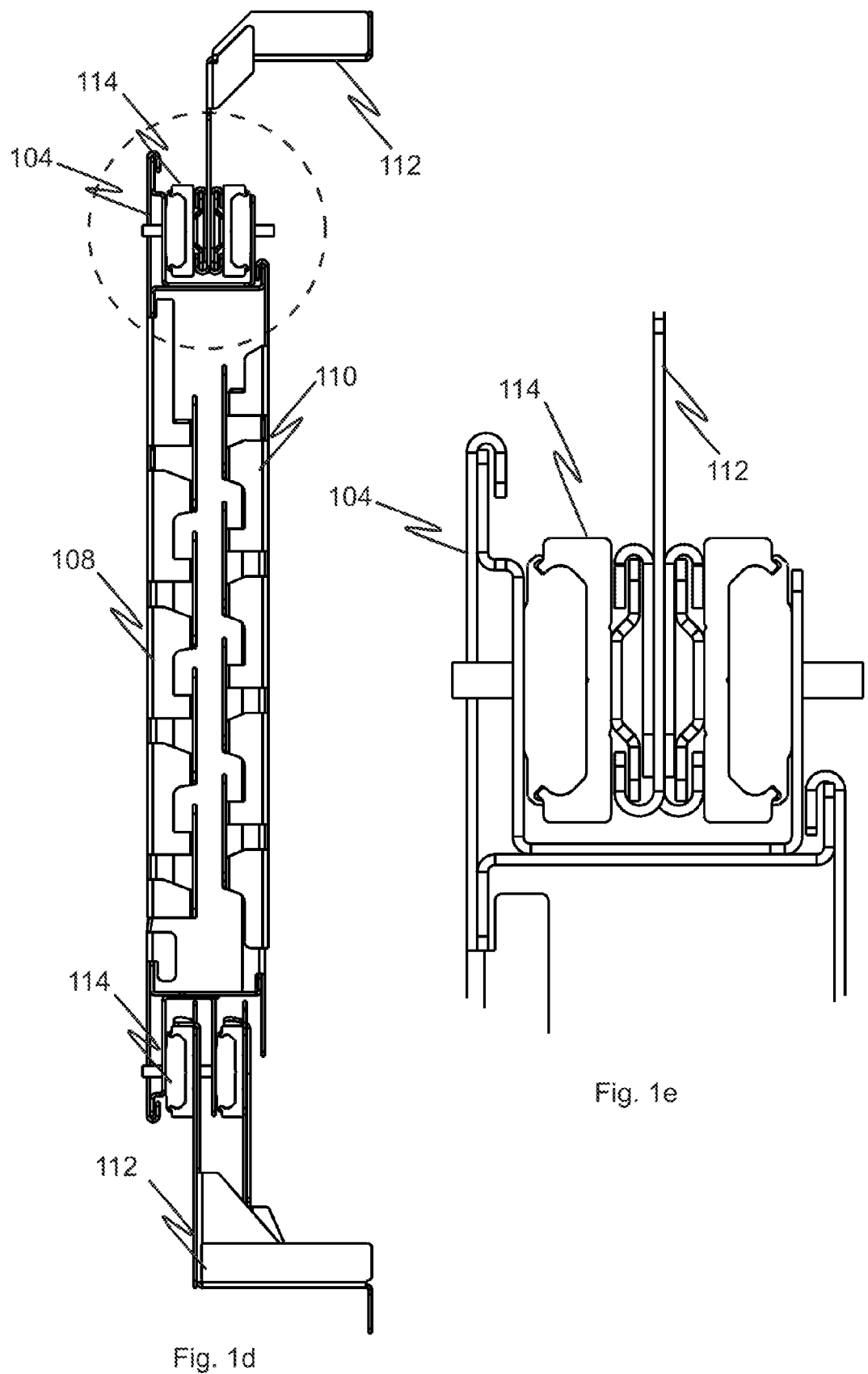
Figure 2:
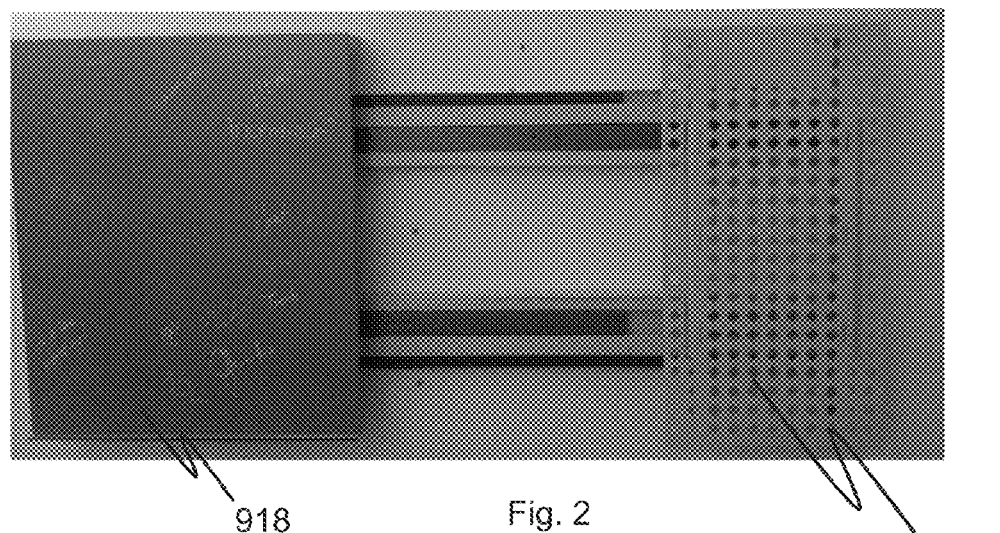
FIG. 2 depicts a front view of the arrangement according to another embodiment of the present invention.

In addition, the first top part 502 is, at least partially, arranged to form a frame 510 for moving means, which in this embodiment are sliding means, such as a sliding carriage with telescopic rails, as can be seen in FIG. 1e. In embodiments having some other moving means for the second elements, the top member naturally can comprise some other elements for moving means, such as hinges etc. In the present embodiment, the frame 510 is arranged in the horizontal plane respect to the wall.

In another embodiment, the frame 510 is arranged in an angle respect to the horizontal plane, so that the sliding means disposed to the frame 510 are arranged in the same angle respect to the horizontal plane. The angle is selected so that the sliding means are arranged to be against the direction of the force caused by the weight of the second element and counterforce caused by the fastening means. This arrangement enables smooth sliding of the sliding means, when the weight of the second element does not cause any torque to the sliding means.

Further, the second top part 504 comprises an edge 508 for the first fastening member to be mounted thereto. In the present embodiment, the edge 508 is arranged to be upwards from the vertical plane of the wall and in parallel with it directing upwards, when the base structure is assembled to the wall, so that the folded section of the first fastening member can be disposed to the edge 508.

Figure 5A:
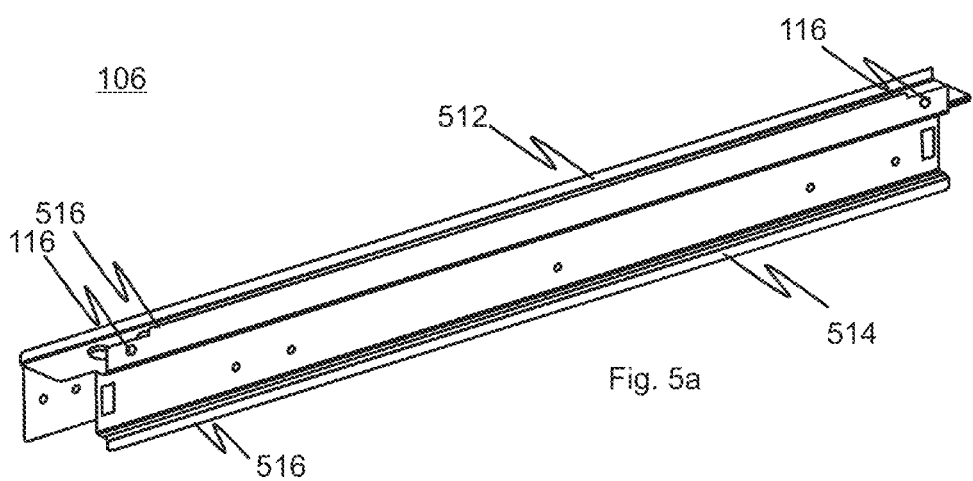
FIG. 5a depicts a perspective view of a bottom member according to an embodiment of the present invention.
Figure 5B:
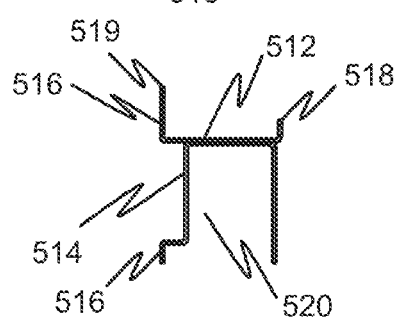
Figure 5C:
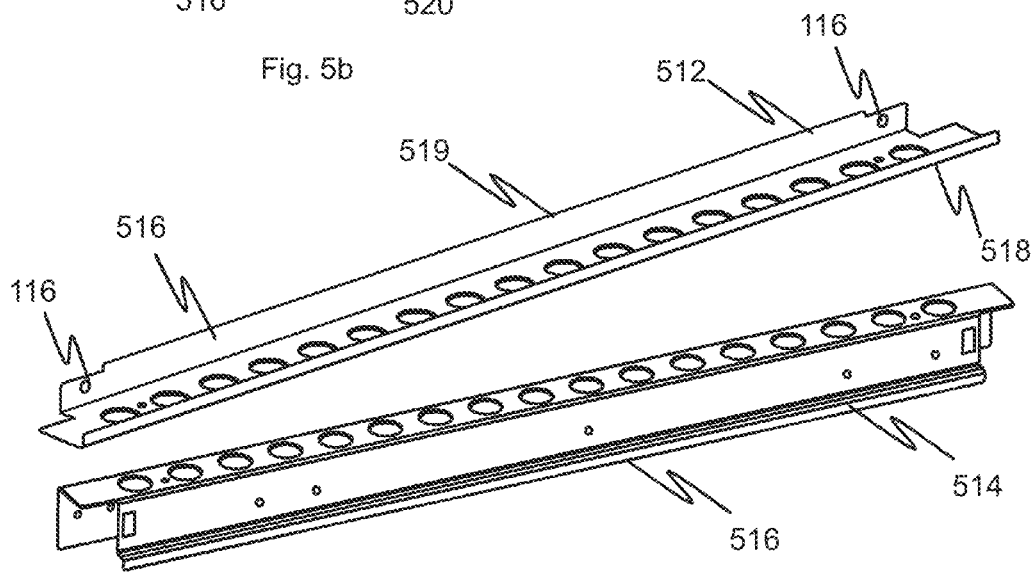

In FIGS. 5a-5c are depicted a perspective view, side view and exploded view of a bottom member 106 according to an embodiment of the present invention. Respective to the top member 104, the bottom member 106 of the present embodiment is composed by two parts; a first bottom part 512 and a second bottom part 514 disposed one above the other. Further, both the first bottom part 512 and the second bottom part 514 comprise a planar section 516, which planar sections 516 are arranged to be placed against the wall. The fastening points 116 respective to the side members fastening point are arranged to the first bottom part 512.

In addition, the first bottom part 512 is arranged to form a frame 520 for moving means. In the present embodiment, the sliding means are arranged to the frame of the top member 104 and the bottom member 106. Because the torque caused by the weight of the second element does not apply to the bottom member 106, the frame 520 is not required to be arranged in an angle. In embodiments having other moving means, the bottom member can naturally comprise some other elements than the frame, such as hinges etc.

Further, the second bottom part 514 comprises an edge 519 disposed against the wall for the side member to be mounted there to by its crook sections and an edge 518 for the first fastening member to be mounted thereto. In the present embodiment, respective to the top member, the edge 518 is arranged to be upwards from the vertical plane of the wall and in parallel with it directing upwards, when the base structure is assembled to the wall, so that the crook section of the first fastening member can be disposed to hang on the edge 518.

The person skilled in the art will appreciate that the top member and the bottom member do not have to be composed by two parts, but they can be implemented with one part or more than two parts. In embodiment, comprising an adjustable top member and bottom member, the adjustable member of the top member and the bottom member comprises preferably three member parts, so that when adjusting the length of the top member and the bottom member, the top and the bottom members maintain the symmetrical regarding to the middle part. However, the side parts can overlap, when the member in a short position.

Figure 6A:
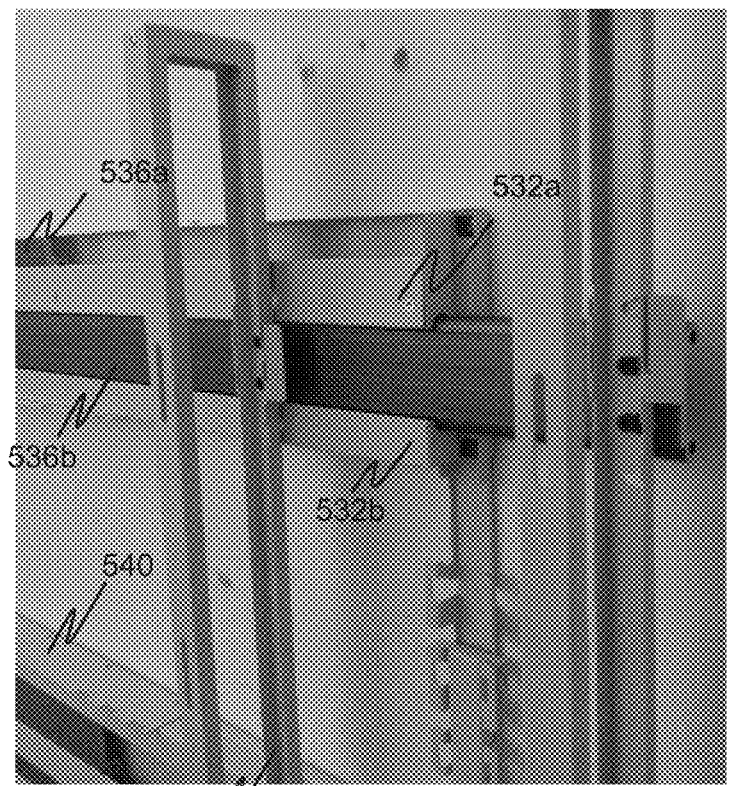
FIG. 6a depicts a perspective view of a horizontal member according to an embodiment of the present invention.
Figure 6B:
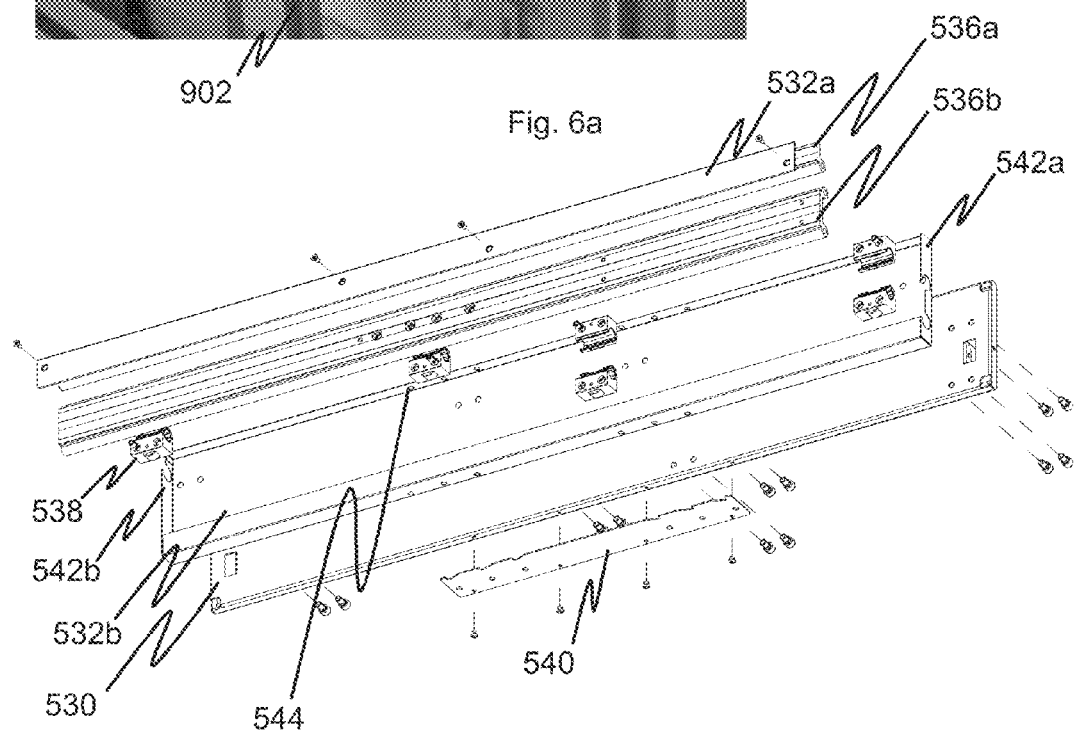

In addition, depending on embodiments, the bottom member 106 of the present invention can also be similar to the top member 104, but just upside down. In FIGS. 6a and 6b are depicted a perspective and an exploded view of such embodiment. The top member and the bottom member in this embodiment are identical, but one, comparing to the other, is mounted on the wall upside down, i.e. substantially 180 degrees in vertical plane. The top and the bottom members of the present embodiment, hereafter also referred as "horizontal members", typically comprise a base plate 530, which is mounted against the wall, and preferably two cover plates 532a and 532b, which cover plates 532a and 532b together form suitable casings for sliding means on the base plate 530.

As described above, sliding means can be implemented in several ways. In embodiment depicted in FIGS. 6a and 6b, sliding means comprises guiding elements 538 fastened on cover plate and rail elements. In one embodiment, the rail elements comprise a single rail 536a and a double rail 536b. For the single rail 536a, the horizontal member comprises two guiding elements 538, such as linear bearings with balls or rollers, for example, and for the double rail there are four guiding elements 538, two upper and two lower elements, respectively. The weight of the second element is arranged to the sliding elements so that the double rail carries the weight of the second elements and the single rail supports it preventing it to fall forward or to press against the wall depending on the position of the single rail, i.e. if it is in the top member or in the bottom member.

Preferably, the guiding elements are fastened in such way that the fastening means, such as screws, connect the cover plates 532a and 532b to the base plate 530 at the same time.

Furthermore, the sliding means typically comprise stopping means for preventing them to fall from their rails. In the present embodiment, the cover plate 532b comprises stopping plates 542a and 542b, which are arranged at the end of the covering plate 532b substantially perpendicular position with the covering plate 532b. The person skilled in the art will understand that the stopping means can also be implemented in some other way and this is only one example to implement them. The stopping plates are advantageously formed so that the sliding means are enabled to slide in the desired direction, in this case the double rail 536b to right and the single rail 536a to left. As described above, the other horizontal bar in the present arrangement is mounted upside down, so the directions are also rotated 180 degrees.

The horizontal plate further comprises fastening points for connecting the first fastening members to the horizontal members. The fastening points are preferably provide in the in both upper edge and lower edge of the horizontal plate, so that both in top member and the bottom member, when mounted to the wall, comprise fastening points for the first fastening members in their upper edge. The upper edge, as well as the lower edge, of horizontal plate is preferably substantially in perpendicular position with the wall.

In the present embodiment, the upper edge of the covering plate 532b comprises openings 544 for the first fastening members. There are at least two openings 544, but the person skilled in the art will understand that more openings can be arranged in order to provide more fastening options for first elements in different size. In FIG. 6b, three openings 544 for both first fastening members are provided in the covering plate 532b.

In one embodiment, the horizontal member further comprises a guiding plate 540, which is connected to the lower fastening points in the horizontal member. The guiding plate preferably comprises e.g. notches, which are provided so as to ease the user for finding the fastening points in the upper edge of the horizontal member. Preferably, both horizontal members comprise the guiding plate so as to help the assembly of the first fastening members connected to the first element to the arrangement.

Though the fastening points and the guiding plate are provided in the covering plate in the present embodiment, the person skilled in the art will understand that the aforementioned parts can be arranged some other way in the horizontal member and this is illustrative purposes only.

Figures 7A, 7B:
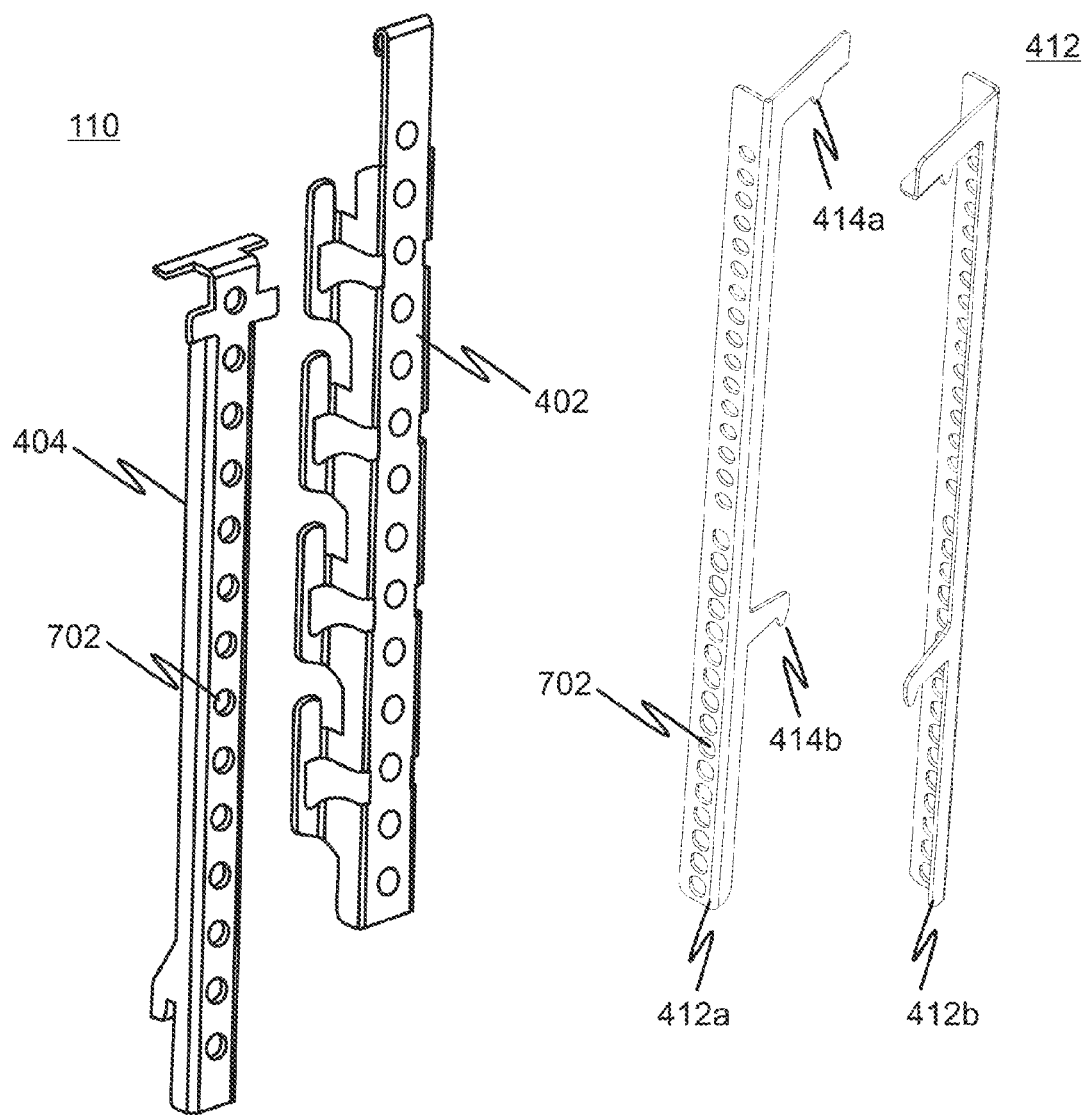
FIG. 7a depicts a first fastening member according to an embodiment of the present invention.
FIG. 7b depicts a first fastening member according to another embodiment of the present invention.

In FIG. 7a is depicted the first fastening member 110 according to an embodiment of the present invention. In the present embodiment, the first fastening member 110 is composed by similar parts and sections as the side member 108 described in accordance with FIG. 3a, except the lower folded section in the second member part 404. However, in one embodiment, the width dimension of the first fastening member 110 is selected to be smaller than the width dimension of side member 108, so that the member parts of the side member and the first fastening member can be placed in nested position with each other, when disposed in a package.

In addition, the member parts 402, 404 of the first fastening member are provided with fastening points 702, such as holes for fastening means, in their longitudinal recess, which is arranged to be placed against the back side of the first element. The number of the fastening points may vary depending on embodiments, but preferably there are e.g. about 4-20 fastening points in one member part, more preferably 10-14 fastening points in one member parts. The fastening points 702 are provided in the first fastening member parts 402, 404 so that when the length of the adjustable member, in this case the first fastening member, is adjusted according to the height of the first element by selecting appropriate groove section for the male section, when connecting the first member part 402 and the second member part 404 together, the fastening points 702 in both member part is arranged one top of the another so as to form one hole through the member parts.

In another embodiment, all or part of the adjustable members can be implemented without groove section and male section. In that case, the member parts preferably are provided with longitudinal recess and fastening points. The fastening points can be e.g. circular or longitudinal openings, by means of which the fastening means fasten the adjustable member to desired length. This embodiment is advantageous, when adjustable member is desired to be steplessly adjustable.

In FIG. 7b is depicted another embodiment of the first fastening member according to the present invention. The first fastening member 412 according to the present embodiment has constant length, which is selected according to the length of the side members. In one embodiment, the arrangement comprises two symmetrical first fastening members, one to be fastened on the right side of the first element 412a and the other to be fastened on the left side 412b. However, in another embodiment, two similar first fastening members, either 412a or 412b, can be fastened to the first element and connect to the horizontal members.

The first fastening member comprises preferably two corresponding fastening parts 414a and 414b for connecting the first fastening member 412 to the fastening points provided in the horizontal members. The form of the fastening parts 414a and 414b can vary, but in the present embodiment the fastening parts 414a and 414b comprise a pointed end, which is arranged to fit in the openings provided the horizontal members. the upper fastening part 414a is connected to the top member and the lower fastening part 414b to the bottom member. The person skilled in the art will understand that this embodiment is just one example to implement the mounting of the first fastening member to the horizontal members and there can be many ways to implement it.

As well as described in accordance with the first fastening member in FIG. 7a, the first fastening member according to the embodiment in FIG. 7b comprises one or more fastening points 702 for user to fasten the first fastening member 412 to the first element.

Figure 7C:
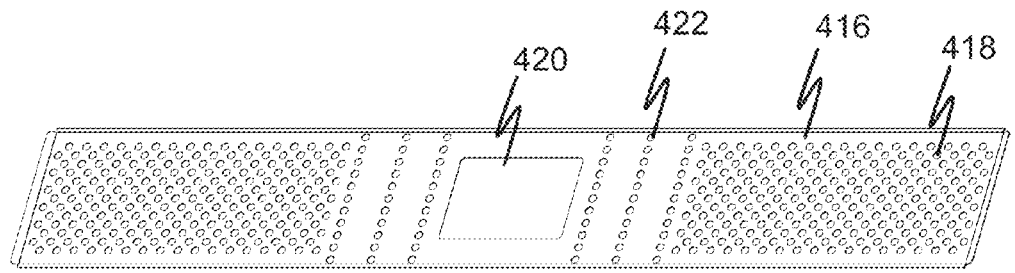
FIG. 7c depicts a cable holder according to an embodiment of the present invention.

In some embodiments, the arrangement according to the present invention further comprises a cable holder, which is depicted in FIG. 7c. Depending on the first element, one or two cable holders 416 can be connect the first element and the cables fastened to the cable holder by using the fastening points 418 and guided through the opening 420. One or more fastening points or rows of the fastening points 422 on both sides of the opening 420 are provided for connecting the cable holder to the first fastening member.

Next, the structure and function of the second element, moving means and second fastening members are described in more detail with the reference to FIGS. 1a-1e and 8a-8d. In the present invention, each second element mounted to the base structure is mounted to the top member 104 and to the bottom member 106 via moving means. In embodiments depicted in FIGS. 1a-1e, the moving means of the present invention is a sliding carriage with telescopic rails 114 and two second elements are mounted to the base structure so that both second elements cover as wide area of the base structure 102. Thus, four sliding carriages 114 are arranged to the arrangement according to the present embodiment of the invention. Two sliding carriages 114 are arranged to the frame in the top member, one for both second elements; and two sliding carriages 114 are arranged to the frame in the bottom member, one for both second elements, respectively. Typically, a sliding carriage with telescopic rails is arranged in a form of a module. Hereinafter, the sliding carriage means a module comprising the sliding carriage and the telescopic rails.

Furthermore, telescopic rails are connected to the sliding carriage so that when the second element connected to the sliding carriage via the second fastening member is in its first position covering the first element, the telescopic rails are in their shortest position, and respectively, when the second element is in its second position revealing the first element, the telescopic rails are in their longest position.

In another embodiment, the moving means are e.g. hinges arranged to turnably move the second element between the first position and the second position. Yet, in another embodiment, the moving means are arranged to rotate the second element in the vertical level between the first position and the second position. The person skilled in the art will appreciate that some other moving means for moving the second element between the first position and the second position can be used in the present invention.

In the present invention, the second element/elements is/are preferably selected so that it/they totally covers/cover the first element. The person skilled in the art will understand that the second element or number of elements can be selected so that the area they cover is bigger than the area of the first element, and in some special cases, smaller than the area of the first element. The second element can also be composed of multiple elements such that the elements are totally or partially overlapping. In this context, the area of the first or the second element means the area on the element in question delimits.

The second element to be mounted to the base structure is connected to the second fastening member, which comprises an upper second fastening member 802 and a lower second fastening member 804. The upper second fastening member 802 is connected to the sliding carriage, which is further arranged in the frame in the top member. Respectively, the lower second fastening member 804 is connected to the sliding carriage, which is further arranged in the frame in the bottom member.

Figure 8A:
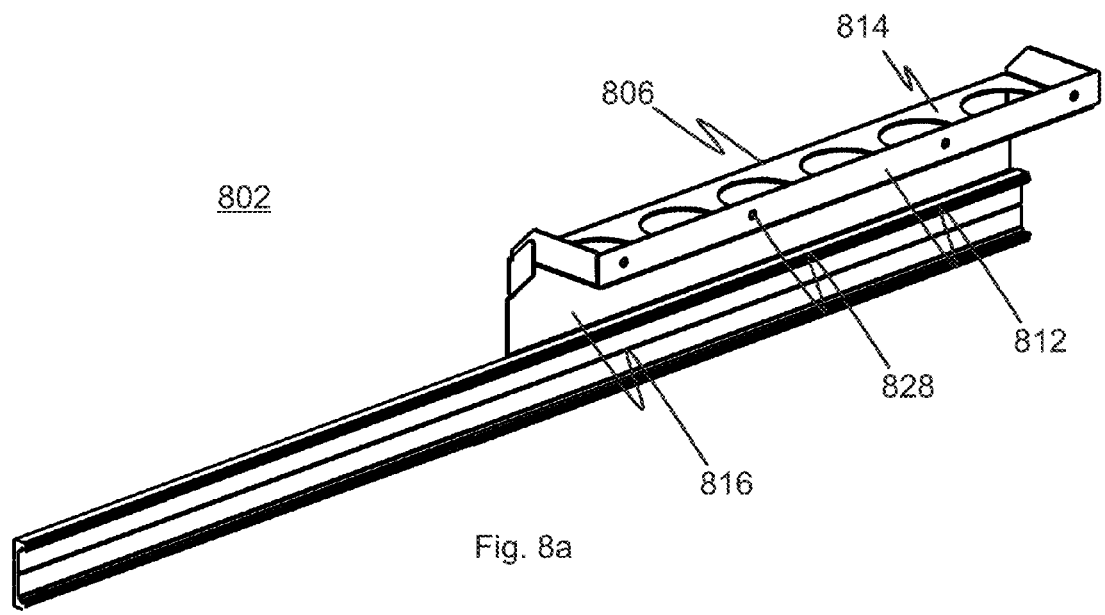
FIG. 8a depicts a perspective view of an upper second fastening member according to an embodiment of the present invention.
Figure 8B:
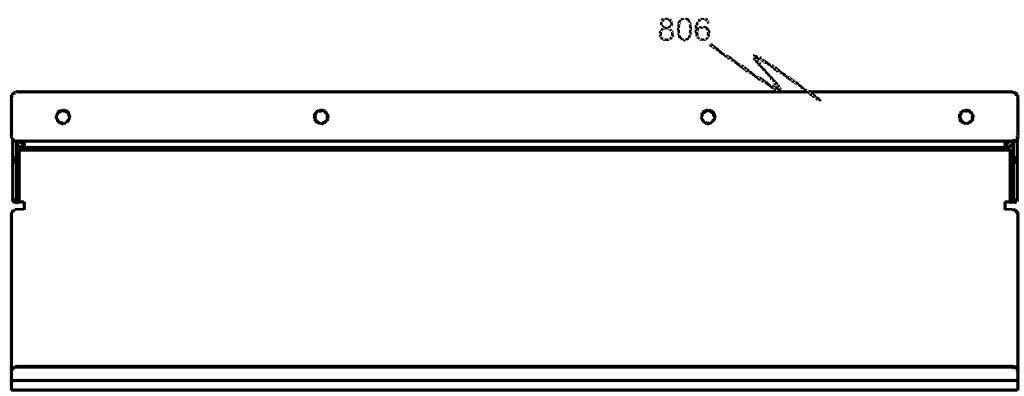
Figure 8B:
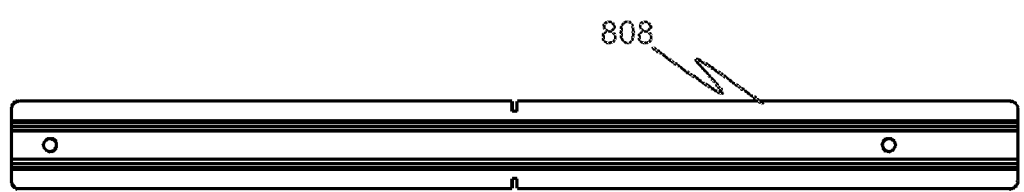
Figure 8B:
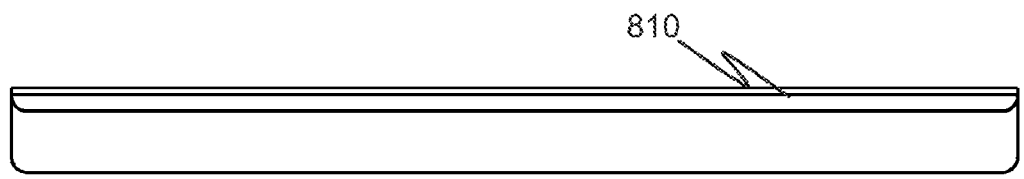

In the embodiment depicted in FIGS. 8a and 8b, the upper second fastening member 802 is composed by three parts; a first upper fastening part 806, a second upper fastening part 808 and a third upper fastening part 810. The first upper fastening part 806 comprises a planar section 812, which is arranged against the second element. The planar section 812 further comprises fastening points 828, such as holes for screws, for fastening the upper second fastening member 802 to the second element. The planar section 812 is connected to a horizontal section 814, which is arranged to the first upper fastening part 806 for providing an appropriate space between the second element and the first element in the arrangement of the present invention. A lower section 816 in the first upper fastening part 806, which is connected to the horizontal section 814, is in vertical position.

In embodiments, having the sliding means arranged in an angle respect to the horizontal plane, the lower section is preferably arranged to be the same angle to which the sliding means are arranged in the frame of the top member.

The second upper fastening part 808 is fastened to the lower section in the first upper fastening part 806 and the third upper fastening part 810 is fastened on the top of the second upper fastening part 808 with appropriate fastening means. Together the second and the third upper fastening parts 808, 810 form a longitudinal recess for rails to retract or extend.

In some embodiments, the form of second upper fastening part 808 is formed to the rail and the upper second fastening member is implemented without the second upper fastening part 808.

Figure 8C:
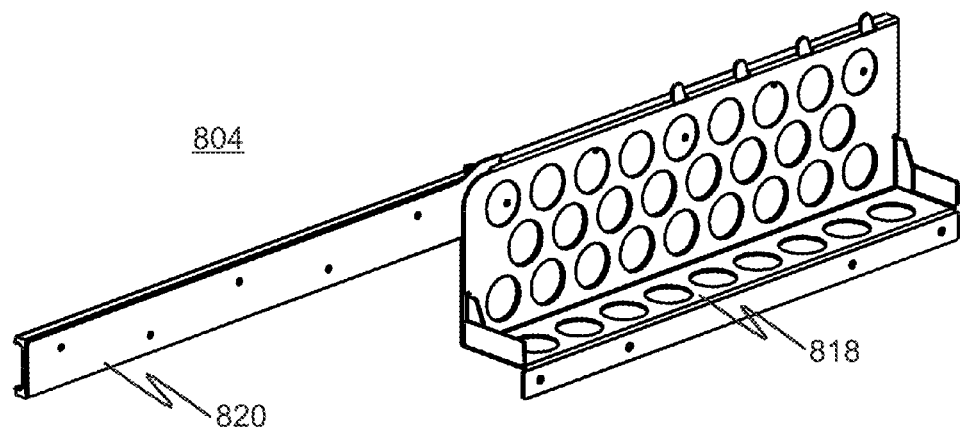
FIG. 8c depicts a perspective view of a lower second fastening member according to an embodiment of the present invention.
Figure 8D:
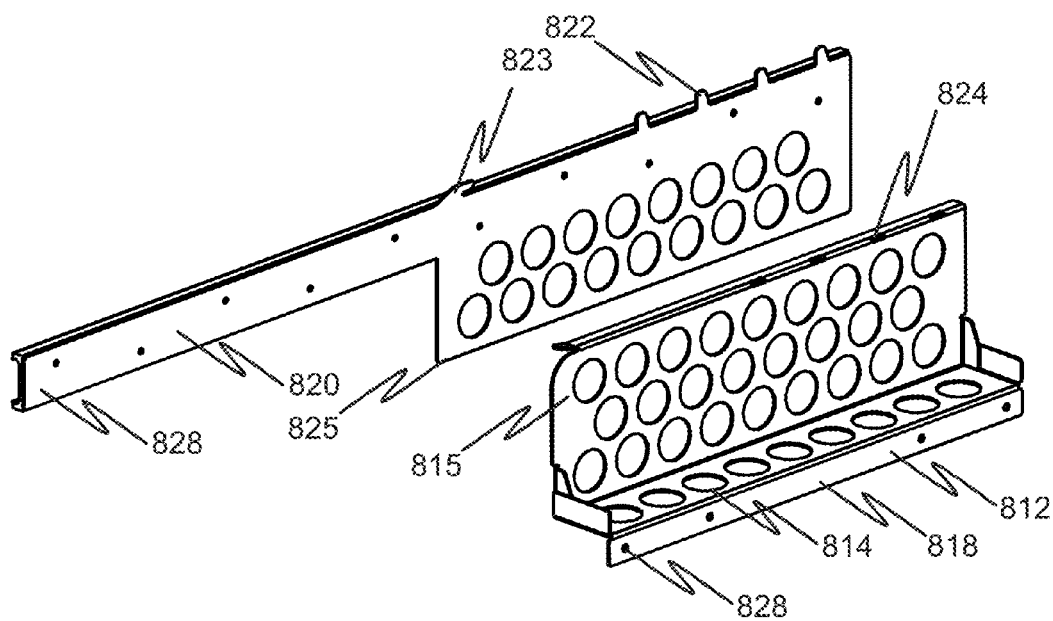
FIG. 8d depicts an exploded view of the lower second fastening member according to FIG. 8c.

Further, the lower second fastening member 804, depicted in FIGS. 8c and 8d, is composed by two parts; a first lower fastening part 818 and a second lower fastening part 820. Referring now to FIG. 8d, correspondingly to the first upper fastening part 806, the first lower fastening part 818 comprises a planar section 812, which is arranged against the second element. The planar section 812 further comprises fastening points 828, such as holes for screws, for fastening the lower second fastening member 804 to the second element. The planar section 812 is connected to a horizontal section 814, which is arranged to the first lower fastening part 818 for providing an appropriate space between the second element and the first element in the arrangement of the present invention. The horizontal section is further connected to a vertical section 815 extending upwards, which vertical section 815 is arranged to be placed against a vertical section of the 825 of the second lower fastening part.

Further, the first lower fastening part 818 is connected to the second lower fastening part 820. In the embodiment depicted in FIG. 8d, the second lower fastening part 820 is provided with brackets 822 and a crook 823. The brackets 822 are arranged to be in a substantially upright position. The first lower fastening part 818 is provided with openings 824 for the brackets 822.

The second lower fastening part 820 further comprises an arm section 828, which arm section preferably comprises a frame structure for rails of sliding carriage. The sliding means is preferably fastened to the second lower fastening part 820.

According to another embodiment, the structure and function of the second element and second fastening members are described in more detail with the reference to FIGS. 2, 6a and 9a-8c.

The second fastening member 902 according to the present embodiment comprises a back side 904 and a front side 906. The distance between the backside 904 and the front side 906 is for protecting the first element to be in contact with the second fastening member 902 or other elements in the arrangement, such as the second element. The first element is arranged to be disposed between the backside 904 and the front side 906 of the second fastening member 902, when the second fastening member 902 is in its closed position.

The back side 904 comprises fastening points 908, preferably a shape of a keyhole. In one embodiment, one keyhole 908a has a vertical narrowing part and two others have a horizontal narrowing part 908b. The sliding means comprise fastening means, e.g. pins or screws, for the keyholes 908a and 908b, as can be seen in FIG. 6a. In one embodiment, the single rail 536a has one pin for the vertical keyhole 908a and the double rail 536b has two pins for the horizontal keyholes 908b. When assembling the arrangement according to the present invention, the wider section of the vertical keyhole 908a of second fastening member 902 is first connected to the single rail pin and moved the second fastening member in vertical direction so that the pin is set to the narrow part of the vertical keyhole 908a. The wider section of the horizontal keyholes 908b is the set to the pins in the double rail 536b and the second fastening member 902 is moved in horizontal direction in order to guide the pins into the narrow section in the horizontal keyholes 908b. Preferably, two second fastening means 902 are connected to one horizontal member, so that the arrangement comprises four second fastening members together.

In one embodiment, the fastening means provided in the single rail and the double rail are screws, for example, and the user can lock the second fastening member by tightening the screws.

Figure 9A:
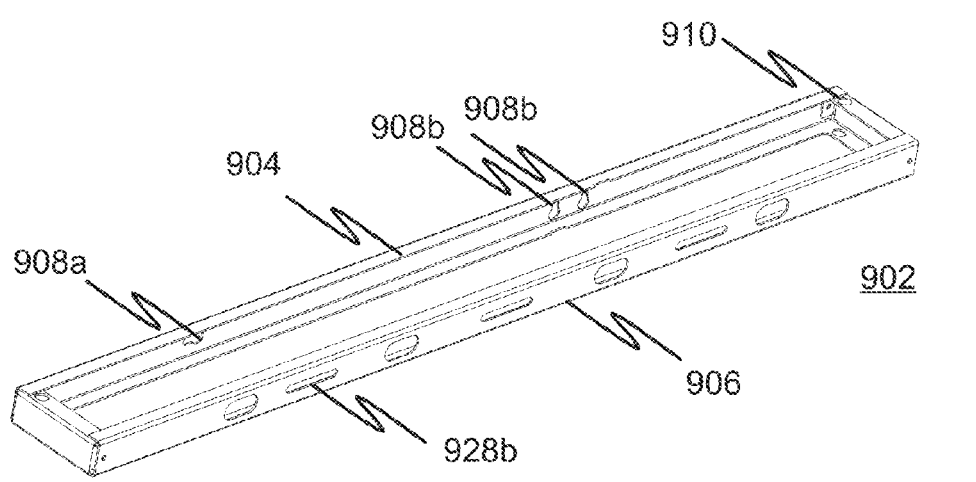
FIG. 9a depicts a second fastening member according to another embodiment of the present invention.
Figure 9B:
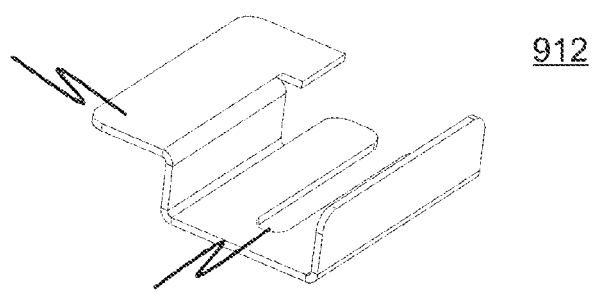

In another embodiment, the arrangement according to the present invention comprises a locking member 912 depicted in FIG. 9*b*. Preferably, the locking member 912 is formed so that it sets over the back side 904 of the second fastening member 902. The recess 914 in the middle of the locking member 912 is set downwards so that the locking member can be slid between the pin/pins of the sliding means, i.e. single rail or double rail, and the back side 904 of the second fastening member 902. In one preferable embodiment, the locking member 912 further comprises a handle 916, by means of which the user can guide it to its place or remove it. Preferably, the arrangement comprises four locking member; one for each pin—keyhole connection, but the person skilled in the art will understand that some of the connections can be provided without the locking member or the locking of some/all connections can be implemented in some other way.

Furthermore, in one embodiment, the second fastening member 902 comprises an opening for side locks 910. Preferably, the opening is made through the second fastening member as can be seen in FIG. 9*a*. Next, connecting of the second element is described in more detail.

Figure 9C:
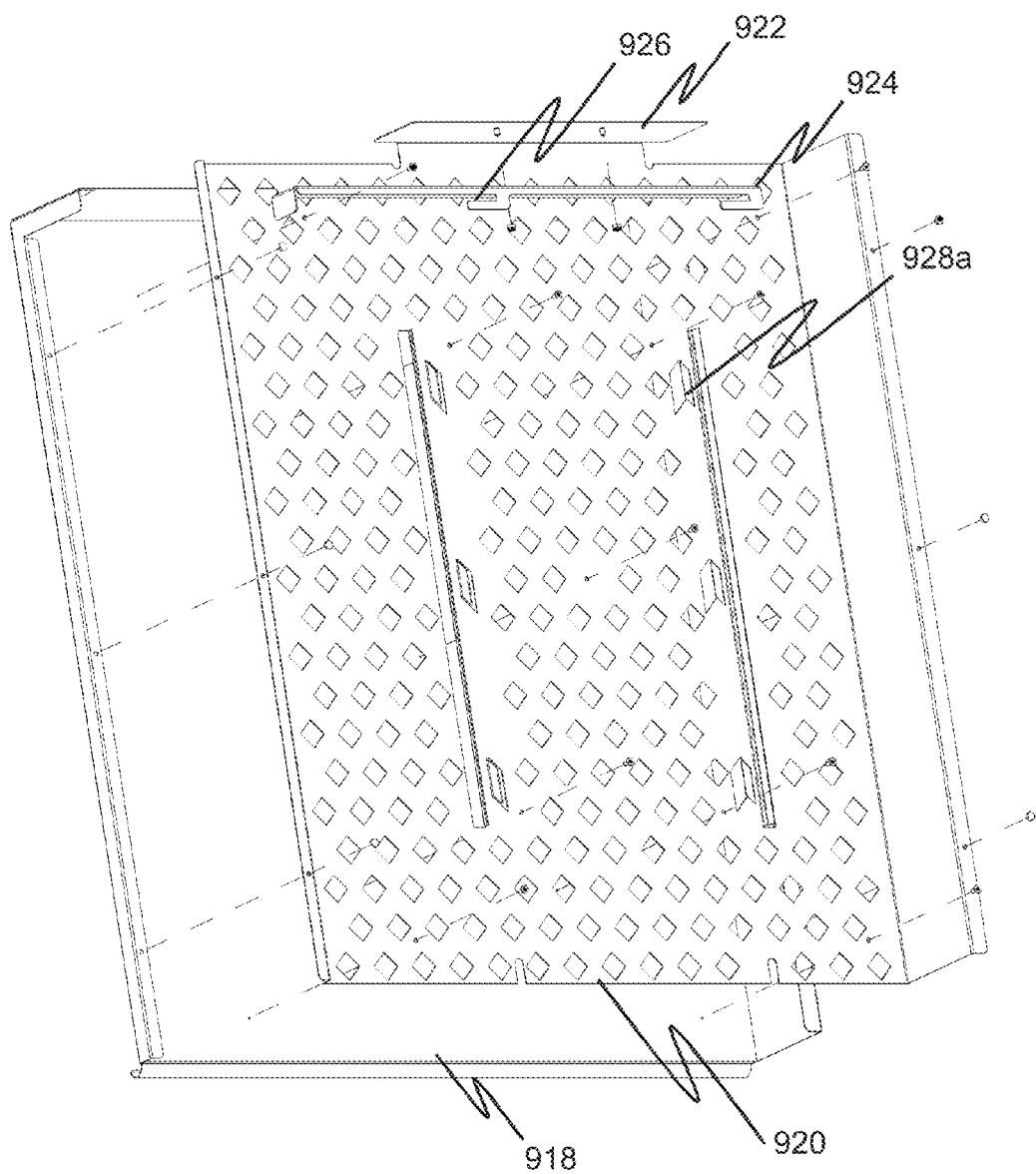

A second element 918, such as panel etc., is connected with a backframe 920. The backframe 920 is preferably made some durable material such as, but not limited to, aluminum, and the weight of the backframe 920 can be reduced by forming openings in the backframe as can be seen in FIGS. 2 and 9*c*. The second elements 918 and the backframe 920 are connected with each other by some normal fastening means, e.g. by screws, gluing etc.

On one embodiment, the upper part of the backframe 920 comprises a roof section 922, which is arranged substantially perpendicular with the backframe 920. In one embodiment, a sidelock member 924 is connected to the roof section. In another embodiment, the sidelock member is formed to the backframe, but in that embodiment two different backframes have to be manufactured for left side and right side second elements.

The sidelock member 924 comprises crooks, which are preferably provided to point to side direction and are set below the roof section 922, when the sidelock member 924 is connected to the roof section 922. The crooks 926 are guided through the opening for side locks 910 provide in the second fastening member 902. Normally, when assembling the second element 918 and the backframe 920 to the second fastening member 902, the second element 918 and the backframe 920 are slightly rotated position, and when the crook sections are guided through the openings the lower part of the second element 918 and the backframe 920 can be set to the vertical position.

In some embodiment, the backframe 920 comprises clasps or some other connecting members, which are provided in two rows. In the present embodiment, the front side 906 of second fastening member 902 comprises openings 928*b* in respective places, so that sideward movement of the second element can be prevented, when moving the second element between its first and second position.

An exemplary embodiment of a method for assembling the base structure to the wall is described next. First, when assembling the base structure to the wall, the upper folded part of the first member part of the side members are mounted to the top member. Then, the top member is fastened to the wall from the fastening points provided to the top member and the first member part of the side member with fastening means. Next, the lower folded part and crook section of the side members are connected to bottom member by coaxing the side members from the end of the bottom member to their place on both sides of the bottom member. After that, the length of the side members is adjusted according to the height of the first element. Finally, the bottom member is fastened to the wall Having both folded section and crook section connected to the bottom member effectively prevent the base structure to be skewed or twisted in any direction, when the base structure is fastened from its four fastening points.

An exemplary embodiment of a method for assembling the first element to the base structure is described next. Preferably, at least two fastening members are used, when the first element is mounted to the base structure. This is advantageous, because two fastening members divides the weight of the first element equally to the base structure and alleviate any torque caused by free sides of the first element. The person skilled in the art will understand that when the first element is very lightweight and/or has small dimensions, it may be adequate to use only one first fastening member. Respectively, when the first element is very heavy or has large dimensions, the assembly can comprise more than two first fastening members to mount the first element to the base structure.

The length of the first fastening members is adjusted according to the height of the first element, as described above, or according to the height of the base structure. Then, the first fastening members are fastened to the back side of the first element from at least one fastening point, preferably, from two fastening points. Next, the first fastening members with the first element are brought in front of the base structure at a distance above the base structure and the right places of the first fastening members in the top member and the bottom member. Then, the first fastening member are lowered to their places so that the folded sections of the first fastening members are mounted to the edge of the top member and the crook sections hang from the edge of the bottom member. In this arrangement, the weight of the first element directs to the bottom members through the crooks section of the first fastening members and the upper folded section only prevents the first element to fall down.

Next, an exemplary embodiment of a method for assembling the second element to the base structure is described. First, the second lower fastening part 820 is fastened to the sliding means. The upper second fastening member 802 is connected to the second element and the first lower fastening part 818 is connected to the second element. Then, the first lower fastening part 818 is arranged in an angle with the second lower fastening part 820, so that the end of the first lower fastening part 818 is hooked to the crook 823 of the second lower fastening part 820. Next, the other end of the first lower fastening part 818 is lowered to the same level with the lower fastening part 820, so that the brackets 822 of the second lower fastening part 820 is directed to the openings 824 of the first lower fastening part 818. Finally, the sliding means are coaxed to the upper second fastening member 802 to the longitudinal recess for rails provided by the second and the third upper fastening parts 808, 810. The upper second fastening members are then fastened to the sliding means.

Typically, the first element is fixedly mounted to the base structure, but the second element is connected to the moving means, preferably via second fastening member(s). The number of second elements in the arrangement can vary in different embodiments. In the embodiment depicted in FIGS. 1a-1c, there are two second elements, which are arranged to move between the first position and the second position. In this invention the first position is in front of the first element covering the first element. In one embodiment, the second position of the second elements is on the both sides of the first element revealing the first element. In another embodiment, the second position is arranged so that one second element is moved above the first element and the other second element is moved below the first element.

In embodiments comprising one second element, the second position can be on whichever side of the first element, above or below the first element. In another embodiments comprising more than two second elements, the second position of the second elements is arranged with some other manner, on both sides and above/below of the first element, for example.

In embodiment comprising two second element, the elements are typically arranged so that both areas covered by the second elements are equally wide. In some other embodiment, especially embodiments comprising more than two second elements, the size of the area covered by second elements may vary.

In some embodiment, the top member and/or the bottom member comprises electric means for providing an automated and/or remotely controlled move of the second element, for example. In this case, the motor block can be disposed, for example, in the top member and/or the bottom member. The person skilled in the art will understand that the motor block may be disposed in some other manner.

The scope of the invention is determined by the attached claims together with the equivalents thereof. The skilled persons will again appreciate the fact that the explicitly disclosed embodiments were constructed for illustrative purposes only, and the scope will cover further embodiments, embodiment combinations and equivalents that better suit each particular use case of the invention.

The invention claimed is:

1. An arrangement for fastening a first element and a second element to a wall, comprising:
   a base structure for spreading total weight of said arrangement, said first element and said second element to an area on the wall delimited by said base structure, which base structure comprises at least four connectable members, which four members are configured for forming, when in use, a substantially rectangle-shaped base structure, comprising first and second substantially horizontal members and at least two side members;
   at least one first fastening member for mounting the first element to the base structure, said at least one first fastening member being configured for fastening to the first element;
   at least one second fastening member, said at least one second fastening member being configured for fastening to the second element; and
   moving means for moving said at least one second fastening member between a first position and a second position, said means for moving are configured for connecting to the at least one second fastening member in order to mount the second element to the base structure.

2. The arrangement according to claim 1, wherein first horizontal member and the second horizontal member are mounted at substantially 180 degrees to one another.

3. The arrangement according to claim 1, wherein the at least one second fastening member is formed so that the first element is set between a front side and a backside of the second element, when the second element is in a covering position.

4. The arrangement according to claim 1, wherein said arrangement further comprises at least one adjustable member for adjusting a length of the at least one adjustable member, the at least one adjustable member comprises at least one first member part and at least one second member part, the at least one first member part and the at least one second member part are connectable with each other.

5. The arrangement according to claim 4, wherein said at least one first member part of the at least one adjustable member comprises at least one groove section and the at least one second member part of the adjustable member comprises a male section, the male section is connectable to one groove section, and which the connection of the at least one first member part and the at least one second member part forms a braced adjustable member.

6. The arrangement according to claim 4, wherein the side members of the base structure are formed by said adjustable members in order to adjust a height of said base structure by adjusting a length of the side members.

7. The arrangement according to claim 4, wherein the at least one first fastening member is formed by said at least one adjustable member in order to adjust a height of the at least one first fastening member.

8. The arrangement according to claim 1, wherein a connection between the at least one second fastening member and the moving means is secured by a locking member.

9. The arrangement according to claim 1, wherein a first position of the second element is in front of said first element, when in use, for covering the first element.

10. The arrangement according to claim 1, wherein a second position of the second element is arranged to reveal the first element, when in use.

11. The arrangement according to claim 1, comprising at least two second elements.

12. The arrangement according to claim 11, wherein said second position of the at least one second element is on one side of the first element and a second position of the at least one other second element is on the other side of the first element, when in use.

13. The arrangement according to claim 11, wherein a second position of the at least one second element is above the first element and said second position of the at least one other second element is below the first element, when in use.

14. The arrangement according to claim 1, wherein said moving means for moving said second element are slidable means.

15. The arrangement according to claim 1, wherein the first element is a television.

16. The arrangement according to claim 1, wherein the second element is a panel.

17. An arrangement for fastening a first element and a second element to a wall, comprising:
   a base structure for spreading total weight of said arrangement, said first element and said second element to an area on the wall delimited by said base structure, which base structure comprises at least four connectable members, which four members are configured for forming, when in use, a substantially rectangle-shaped base structure, comprising first and second substantially horizontal members and at least two side members;

at least one first fastening member for mounting the first element to the base structure, said at least one first fastening member being configured for fastening to the first element;

at least one second fastening member, said at least one second fastening member being configured for fastening to the second element; and a sliding carriage with telescopic rails configured for moving said at least one second fastening member between a first position and a second position, said sliding carriage with telescopic rails connecting to the at least one second fastening member in order to mount the second element to the base structure.

\* \* \* \* \*